No. 645,224. Patented Mar. 13, 1900.
H. BOEHLING.
PACKING.
(Application filed Nov. 14, 1899.)
(No Model.)
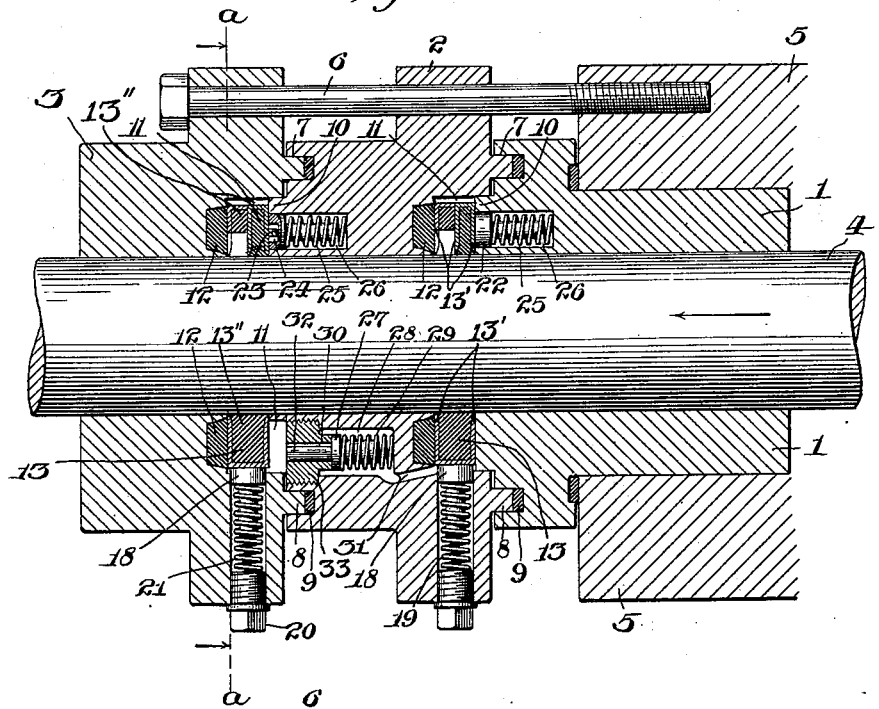
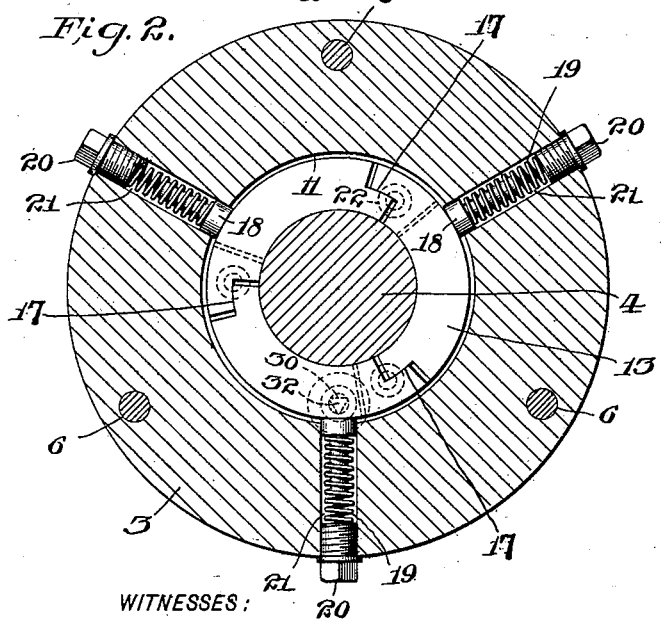
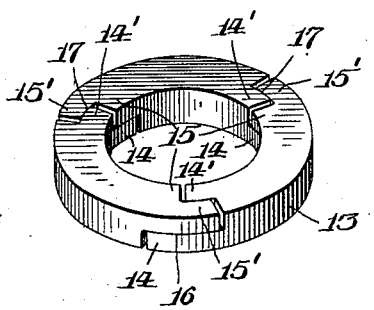
WITNESSES:
A. V. Groupe
Percival H. Granger.
INVENTOR
Henry Boehling
BY
Charles N. Butler
ATTORNEY
THE NORRIS PETERS CO., PHOTO-LITHO., WASHINGTON, D. C.

UNITED STATES PATENT OFFICE.

HENRY BOEHLING, OF PHILADELPHIA, PENNSYLVANIA.

PACKING.

SPECIFICATION forming part of Letters Patent No. 645,224, dated March 13, 1900.

Application filed November 14, 1899. Serial No. 736,925. (No model.)

*To all whom it may concern:*

Be it known that I, HENRY BOEHLING, a resident of the city of Philadelphia, State of Pennsylvania, have invented certain new and useful Improvements in Packing, of which the following is a specification.

My invention relates to packing for piston-rods and is particularly designed for ammonia packing, as in ice-machines. Its primary objects are to provide a more effective packing than has heretofore been employed and to permit the expansion and return of gas escaping from the compressor.

In the accompanying drawings, illustrating my invention, Figure 1 is a longitudinal sectional view of my packing in its relation to a piston-rod. Fig. 2 is a transverse sectional view on the line $a\ a$ of Fig. 1, and Fig. 3 is a perspective view of the sectional packing-ring.

In the drawings the followers, as 1, 2, and 3, through which the piston-rod 4 reciprocates, may be held to the compressor-head 5 by the bolts 6. Each of the followers 1 and 2 is provided with a groove 7, which receives the ring 8 of the proximate follower, a soft-metal packing-ring 9 being placed in each groove 7 as a seat for each ring 8. Each of the followers 1 and 2 is provided with a ring 10, which fits within the cylindrical channel 11 of the proximate follower. A soft-metal ring 12 is seated at the end of each of the cylindrical channels 11.

A sectional packing-ring 13 lies in each of the channels 11 between the corresponding rings 10 and 12. The rings 13 are formed, preferably, in three sections jointed by double lap-joints, each section having a lap 14 and a lap 15, joining on a surface 16, and also a lap 14' and a lap 15', joining on a surface 17. The sections of the rings are held together on the surfaces 17 and against the piston-rod 4 by plungers 18, sufficient play between the ends of the sections being provided to permit the requisite contraction. The plungers are pressed inward by the coiled springs 19, seated against the plugs 20, which close the recesses 21, within which the springs and plungers operate. Plungers 22 hold the sections together on the surfaces 16 and against the rings 12, a stud 23 on each section playing within a recess 24 in each plunger to permit the sections to contract and expand independently of these plungers. The plungers 22 are pressed outward by the coiled springs 25, bearing against the ends of the recesses 26, within which the springs and plungers operate.

A valve 27, located in the recess 28 and controlled by a coiled spring 29, normally closes a port 30, which leads from the channel 11, between the followers 2 and 3, through the passage 31, to the channel 11, between the followers 1 and 2. The valve is provided with a stem 32, suitably triangular in section, which plays within the cylindrical opening or port 30 to guide the valve. The port 30 is located in a screw-plug 33, set in the follower 2.

The rings 12 are formed, preferably, of an alloy of tin and lead. The sectional rings 13 are preferably formed of a shell 13' of hard metal, as steel, and a body 13'' of soft metal, consisting of an alloy of lead and tin. The hard shell and the soft body are so arranged that each frictional area involves the impact of hard metal and soft metal. This is effected by forming the periphery, the two parallel faces, the bearing-surface 16 of the lap 14, and the bearing-surface 17 of the lap 14' of steel, while the soft-metal body is exposed at the interior surface of the sectional ring on the bearing-surface 16 of the lap 15 15' and the bearing-surface 17 of the lap 15'.

In the operation when the piston-rod travels in the direction of the arrow gas that may escape from the compressor and follow the rod will be checked by the first sectional packing-ring having its soft-metal interior in close bearing-contact with the piston-rod and its hard-metal shell in close contact with the proximate soft-metal ring, every joint being held closed by pressure, as explained. Any gas that may pass the first sectional ring is checked by the second sectional ring and by its pressure lifts the valve and passes from the channel occupied by the second ring back to the channel occupied by the first ring through the connecting-passages. The back stroke of the piston carries gas in the channels occupied by the rings back to the compressor.

Having described my invention, I claim—

1. In a packing, a ring divided into sections connected by double lap-joints having bearing-surfaces substantially at right angles to each other, each section having an outer lap and an inner lap, in combination with plungers acting substantially at right angles to each other for pressing said sections together on said bearing-surfaces, as specified.

2. In a packing, in combination with a piston-rod, a follower, a ring divided into sections connected by double lap-joints having a bearing-surface transverse to said piston-rod, and a bearing-surface parallel thereto, each of said sections having an outer lap and an inner lap, plungers for pressing said sections against said piston-rod and together on said bearing-surfaces parallel thereto, and plungers for pressing said sections against said follower and together on said transverse bearing-surfaces.

3. In a packing, in combination with a piston-rod, a follower, a soft-metal ring seated in said follower, a ring divided into sections connected by double lap-joints having a bearing-surface transverse to said piston-rod, and a bearing-surface parallel thereto, plungers for pressing said sections against said piston-rod and together on said surfaces parallel thereto, and plungers for pressing said sections against said soft-metal ring and together on said transverse bearing-surfaces.

4. In a packing, in combination with a piston-rod and a follower, a channel at the joint of said follower, a valve opened by fluid-pressure and automatically closing communicating with said channel, and a passage leading from said valve, substantially as specified.

5. In a packing, a follower, a second follower joined thereto, a channel between said followers, a valve located in said second follower, and communicating with said channel, and a passage leading from said valve, substantially as specified.

6. In a packing, in combination with a piston-rod, a follower, a second follower joined thereto, a channel between said followers, a valve in said second follower communicating with said channel, a passage leading from said valve, and a second channel communicating with said passage, substantially as specified.

7. In a packing, in combination with a piston-rod, a follower, a second follower joined thereto, a channel between said followers in communication with said piston-rod, a passage through said second follower, a valve-port connecting said channel and passage, and a spring-controlled valve having a stem which reciprocates in said port.

8. In a packing, in combination with a piston-rod, a follower, a second follower joined thereto, a channel between said followers in communication with said piston-rod, a sectional packing-ring in said channel, a passage through said second follower, a valve-port connecting said channel and passage, a valve for controlling said port, a second channel in communication with said passage and said piston-rod, and a sectional packing-ring in said second channel, substantially as specified.

9. In a packing, in combination with a piston-rod, a follower, a second follower joined thereto, a channel between said followers in communication with said piston-rod, a sectional packing-ring in said channel, a third follower joined to said second follower, a channel between said second and third followers, a sectional packing-ring in said second channel, a passage connecting said channels, and a valve for controlling said passage, substantially as specified.

10. A sectional packing-ring consisting of a hard-metal shell and a soft-metal body, said sections being connected by double lap-joints, the frictional contact between the joints of the sections involving the bearing of a hard-metal surface on a soft-metal surface, substantially as specified.

In witness whereof I have hereunto signed my name, this 10th day of November, A. D. 1899, in the presence of the subscribing witnesses.

HENRY BOEHLING.

Witnesses:
JNO. STOKES ADAMS,
C. N. BUTLER.